US012277915B2

(12) United States Patent
Glen

(10) Patent No.: US 12,277,915 B2
(45) Date of Patent: Apr. 15, 2025

(54) VIDEO TIMING FOR DISPLAY SYSTEMS WITH VARIABLE REFRESH RATES

(71) Applicant: ATI TECHNOLOGIES ULC, Markham (CA)

(72) Inventor: David I. J. Glen, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 251 days.

(21) Appl. No.: 18/108,251

(22) Filed: Feb. 10, 2023

(65) Prior Publication Data

US 2023/0290319 A1 Sep. 14, 2023

Related U.S. Application Data

(63) Continuation of application No. 17/030,659, filed on Sep. 24, 2020, now Pat. No. 11,594,194.

(51) Int. Cl.
*G09G 5/00* (2006.01)
*G09G 5/36* (2006.01)

(52) U.S. Cl.
CPC ............. *G09G 5/006* (2013.01); *G09G 5/363* (2013.01); *G09G 2310/08* (2013.01); *G09G 2320/10* (2013.01)

(58) Field of Classification Search
CPC .... G09G 5/006; G09G 5/363; G09G 2310/08; G09G 2320/10
See application file for complete search history.

(56) References Cited

U.S. PATENT DOCUMENTS

| | | | | |
|---|---|---|---|---|
| 9,182,643 B1 | 11/2015 | Ge et al. | | |
| 2008/0055318 A1* | 3/2008 | Glen | G09G 3/20 | 345/501 |
| 2008/0100598 A1* | 5/2008 | Juenger | G09G 5/36 | 345/204 |

(Continued)

FOREIGN PATENT DOCUMENTS

| | | |
|---|---|---|
| CN | 109196578 | 1/2019 |
| CN | 110012333 | 7/2019 |
| CN | 111105766 | 5/2020 |

OTHER PUBLICATIONS

Extended European Search Report issued in U.S. Appl. No. 21/871,789, mailed Oct. 10, 2024, 12 pages.

(Continued)

*Primary Examiner* — Xin Sheng

(57) ABSTRACT

A display system supports variable refresh rates that include a plurality of refresh rates. A source such as a graphics processing unit (GPU) provides frames to the display system at a selected one of the refresh rates. The refresh rates are factored into a corresponding plurality of prime factors. A plurality of numbers of lines per frame in frames provided at the plurality of refresh rates is determined based on one or more ratios of the plurality of refresh rates, the plurality of prime factors, and a line rate for providing frames to the display system at the plurality of refresh rates. The source then selectively provides frames to the display system at one refresh rate of the plurality of refresh rates using the same line rate regardless of which refresh rate is chosen. Furthermore, the number of lines per frame is an integer for frames provided at the refresh rates.

20 Claims, 4 Drawing Sheets

(56) References Cited

U.S. PATENT DOCUMENTS

| | | | | |
|---|---|---|---|---|
| 2011/0013881 | A1* | 1/2011 | Itani | H04N 21/4147 386/230 |
| 2015/0346528 | A1* | 12/2015 | Ge | G02F 1/136213 349/39 |
| 2016/0092010 | A1* | 3/2016 | Agarwal | G06F 3/0412 345/173 |
| 2016/0275916 | A1 | 9/2016 | Glen et al. | |
| 2017/0118443 | A1 | 4/2017 | Kim et al. | |
| 2017/0124934 | A1* | 5/2017 | Verbeure | G09G 3/3611 |
| 2018/0174551 | A1 | 6/2018 | Ansari | |
| 2018/0277054 | A1 | 9/2018 | Colenbrander | |
| 2019/0371264 | A1 | 12/2019 | Koo et al. | |

OTHER PUBLICATIONS

International Preliminary Report on Patentability issued in Application No. PCT/IB2021/058658, mailed Apr. 6, 2023, 8 pages.
International Preliminary Report on Patentability issued in Application No. PCT/IB2021/058694, mailed Apr. 6, 2023, 7 pages.
Notice of Allowance mailed May 11, 2023 for U.S. Appl. No. 17/884,793, 10 pages.
Office Action issued in Chinese Application No. 202180065625.4, mailed Oct. 18, 2023, 5 pages.
Office Action issued in U.S. Appl. No. 17/884,793, mailed Feb. 2, 2023, 8 pages.
Extended European Search Report issued in U.S. Appl. No. 21/871,796, mailed Sep. 9, 2024, 11 pages.

* cited by examiner

VIDEO TIMING FOR DISPLAY SYSTEMS WITH VARIABLE REFRESH RATES

CROSS-REFERENCE TO RELATED APPLICATIONS

The present application is a Continuation application of U.S. patent application Ser. No. 17/030,659, entitled "VIDEO TIMING FOR DISPLAY SYSTEMS WITH VARIABLE REFRESH RATES", and filed on Sep. 24, 2020, now issued as U.S. Pat. No. 11,594,194 the entirety of which is incorporated by reference herein.

BACKGROUND

A display system typically includes a screen that displays video rendered by a processor such as a graphics processing unit (GPU) and provided to the screen in a stream of frames. The display video timing is determined by a frame rate (or refresh rate), a number of pixels per line in the frame (HTotal), a number of lines per frame (VTotal), and a pixel clock rate (PClk) that is equal to the product of the refresh rate, the number of pixels per line, and the number of lines per frame. The number of pixels per line includes a horizontal active region that includes pixel values used to generate images and a horizontal blanking region that conveys other information such as digital audio or metadata. Thus, the total number of pixels per line is equal to a sum of the pixels in the horizontal active region and the pixels in the horizontal blanking region. The number of lines per frame includes a vertical active region that includes pixel values and a vertical blanking region that conveys other information such as digital audio or metadata. Thus, the total number of lines per frame is equal to a sum of the lines in the vertical active region and the lines in the vertical blanking region. For example, a high definition frame can represent an image using 1080 active vertical lines that include values of the pixels and 45 vertical blanking lines. A line rate for the frame is defined as the pixel clock rate divided by the number of pixels per line or, equivalently, as the product of the refresh rate and the number of lines per frame.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
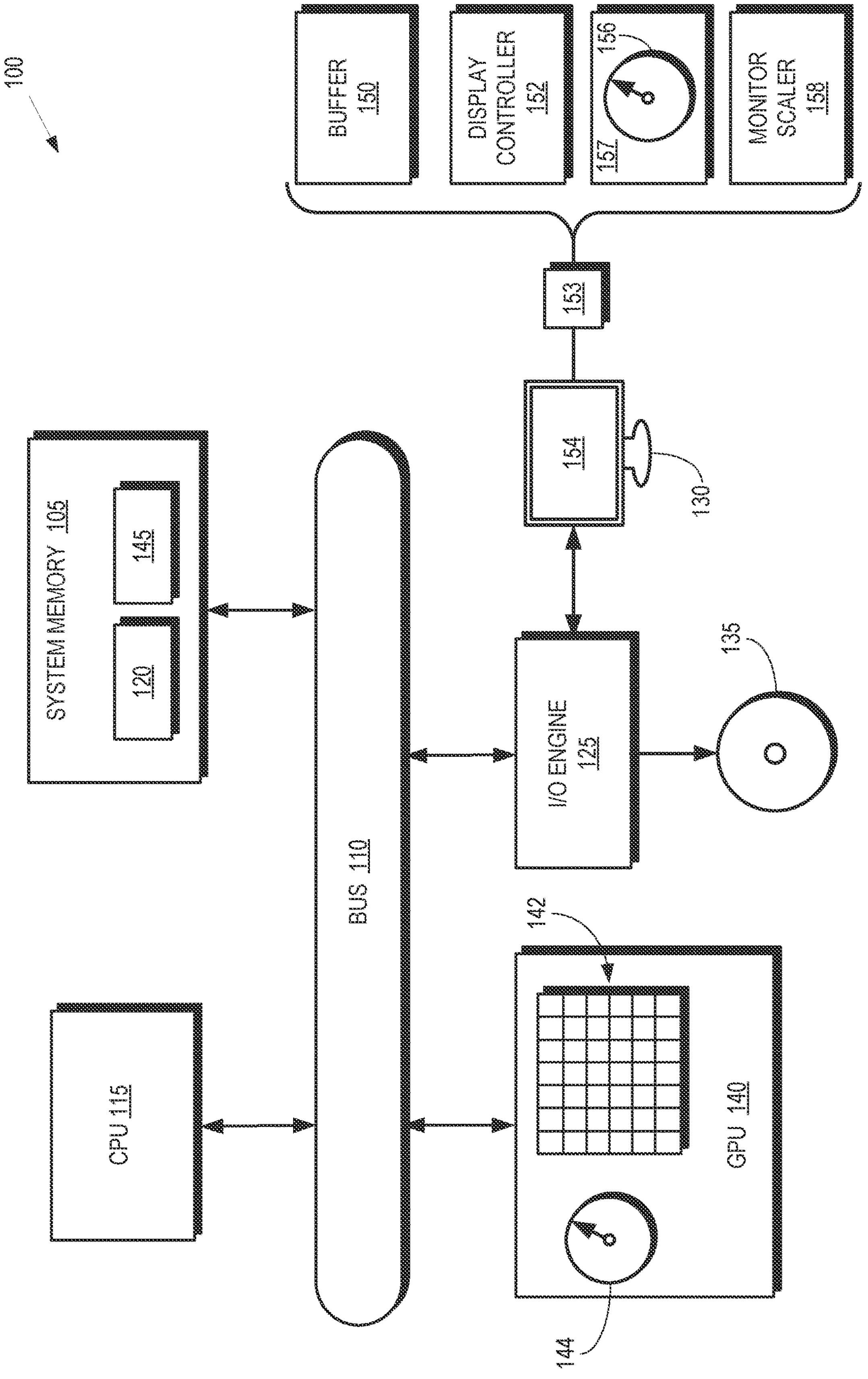
FIG. 1 is a block diagram of a processing system that generates and displays frames at variable refresh rates using a common line rate that is determined based on prime factors of the variable refresh rates according to some embodiments.

A source (e.g., a GPU or other processor) provides frames at a refresh rate that is determined by source timing. The timing of the display system is synchronized to the source timing. For example, the source can provide frames at 60 Hertz (Hz) and the display system can read/display the frames at 60 Hz at times that are synchronized to the GPU. However, video is captured or generated at different refresh rates by different sources. For example, video is typically rendered at 50 Hz in some geographical regions such as Europe and Japan, while video is rendered at 60 Hz in another geographical region such as North America. Display systems therefore implement variable refresh rates to allow the refresh rate to change from, for example, 50 Hz to 60 Hz and vice versa. The source and display systems that implement variable refresh rates typically use the same pixel clock rate and the same number of pixels per line for the different refresh rates. The number of lines per frame therefore changes in response to the changing refresh rate to preserve the fixed pixel clock rate and number of pixels per line, that is, to maintain a constant line rate. The change in the number of lines per frame is determined by the ratio of the refresh rates and so the change in the refresh rate from a first refresh rate to a second refresh rate typically leads to a fractional number of lines per frame at the second refresh rate. Display systems account for the fractional line rate using techniques including rounding the fractional number of lines per frame up or down (corresponding to a refresh rate that is higher or lower than the target refresh rate) or dithering between integer values of the number of lines per frame for even/odd frames. Furthermore, display systems perform a mode reset in response to detecting a change in the refresh rate or number of lines per frame, which causes display interruptions of up to a few seconds.

FIGS. 1-4 disclose embodiments of a display system does not require a mode reset in response to a change in a refresh rate by implementing the same line rate for a set of refresh rates supported by the display system. As used herein, the term "line rate" refers to the product of the refresh rate used by the display system to present frames on a screen and the number of lines per frame provided by a source such as a graphics processing unit (GPU). In some embodiments, frames that are provided to the display system include numbers of lines per frame determined by at least one ratio of the refresh rates in the set. The numbers of lines per frame used for the set of refresh rates are chosen so that the line rate is constant over the set of refresh rates. Furthermore, the numbers of lines per frame associated with the refresh rates in the set are determined based on prime factors of the refresh rates to ensure that the numbers of lines per frame are integer values. For example, if the set includes a first refresh rate and a second refresh rate, frames provided at the first refresh rate include a first number of lines per frame and frames provided at the second refresh rate include a second number of lines per frame that is equal to the first number of lines per frame multiplied by a ratio of the second refresh rate to the first refresh rate. The first and second numbers of lines per frame are guaranteed to be integer values if the prime factors of the numerator and denominator of the ratio (the second, higher refresh rate and the first, lower refresh rate, respectively) are also prime factors of the first and second numbers of lines per frame, respectively. Some embodiments of the source and display system implement more than two refresh rates, in which case an iterative process is used to find common prime factors that are shared by the refresh rates. The prime factors are also chosen so that the number of lines per frame has these prime factors. In some embodiments, the numbers of lines per frame associated with the refresh rates in the set include the same number of lines in the vertical active region and different numbers of lines in the vertical blanking region. Thus, multiple refresh rates are supported with a common line rate and integer number of lines per frame for all refresh rates.

FIG. 1 is a block diagram of a processing system 100 that generates and displays frames at variable refresh rates using a common line rate that is determined based on prime factors of the variable refresh rates according to some embodiments. The processing system 100 includes or has access to a system memory 105 or other storage component that is implemented using a non-transitory computer readable medium such as a dynamic random-access memory (DRAM). However, some embodiments of the memory 105 are implemented using other types of memory including static RAM (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes at least one central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 and communicates with the memory 105 via the bus 110. The CPU 115 executes instructions such as program code 120 stored in the memory 105 and the CPU 115 stores information in the memory 105 such as the results of the executed instructions. The CPU 115 is also able to initiate graphics processing by issuing draw calls.

An input/output (I/O) engine 125 handles input or output operations associated with a display system 130, as well as other elements of the processing system 100 such as keyboards, mice, printers, external disks, and the like. The display system 130 supports a variable refresh rate so that the display system 130 can present frames at refresh rates within a range up to a maximum refresh rate. For example, the display system 130 can support refresh rates of 24 Hz, 25 Hz, 30 Hz, 50 Hz, 60 Hz, 100 Hz, and 120 Hz. The variable refresh rate corresponds to a variable vertical blanking region, which is within a range beginning at a minimum vertical blanking region that corresponds to the maximum refresh rate of the display system 130. In some embodiments, the refresh rates are determined by querying the display system 130 its Enhanced Extended Display Identification Data (E-EDID) and determining the refresh rates from the EDID reply. The I/O engine 125 is coupled to the bus 110 so that the I/O engine 125 communicates with the memory 105, the CPU 115, or other entities that are connected to the bus 110. In the illustrated embodiment, the I/O engine 125 reads information stored on an external storage component 135, which is implemented using a non-transitory computer readable medium such as a compact disk (CD), a digital video disc (DVD), and the like. The I/O engine 125 also writes information to the external storage component 135, such as the results of processing by the CPU 115.

The processing system 100 includes at least one GPU 140 that renders images for presentation by the display system 130. For example, the GPU 140 renders objects to produce values of pixels that are provided to the display system 130, which uses the pixel values to display an image that represents the rendered objects. The GPU 140 includes one or more processing elements such as an array 142 of compute units that execute instructions concurrently or in parallel. Some embodiments of the GPU 140 are used for general purpose computing. In the illustrated embodiment, the GPU 140 communicates with the memory 105 (and other entities that are connected to the bus 110) over the bus 110. However, some embodiments of the GPU 140 communicate with the memory 105 over a direct connection or via other buses, bridges, switches, routers, and the like. The GPU 140 executes instructions stored in the memory 105 and the GPU 140 stores information in the memory 105 such as the results of the executed instructions. For example, the memory 105 stores a copy 145 of instructions that represent a program code that is to be executed by the GPU 140. The GPU 140 also includes a timing reference 144.

The GPU 140 generates a stream of frames that is provided to the display system 130. Some embodiments of the display system 130 include a buffer 150 that stores the frames in the stream received from the GPU 140. The display system 130 also includes a display controller 152 that reads out the pixel values in the frames from the buffer 150 and uses the values to display an image on (or present an image to) a screen 154. The display controller 152 provides the frames via a display interface 153 (such as an HDMI or DisplayPort interface) configured to couple to the screen 154. The display system 130 also includes a timing reference 156, which is synchronized to the GPU timing reference 144 during normal operation. For example, the GPU 140 can generate frames at 60 Hz and provide the frames to the display system 130, which displays or presents the frames on the screen 154 at 60 Hz. Some embodiments of the timing reference 156 are implemented in a timing controller (TCON) chip 157, e.g., as an application-specific integrated circuit (ASIC) or other circuit, which also performs timing and synchronization operations for the display system 130, as discussed herein. The display system 130 also includes a monitor scaler 158 that scales information in the frames received from the GPU 140 to the pixel density of the screen 154.

The frames generated by the GPU 140 and displayed by the display system 130 are characterized by a number of pixels per line in the frame (HTotal), a number of lines per frame (VTotal), and a pixel clock rate (PClk) that is equal to the product of the refresh rate, the number of pixels per line, and the number of lines per frame. A line rate for the frame is defined as the pixel clock rate divided by the number of pixels per line or, equivalently, as the product of the refresh rate and the number of lines per frame. The refresh rates used by the GPU 140 and the display system 130 are factored into a corresponding plurality of prime factors. For example, a frame rate of 50 Hz has the prime factors (5, 2) and a frame rate of 60 Hz as the prime factors (2, 3, 5). Numbers of lines per frame in the frames provided by the GPU 140 at the multiple refresh rates is determined based on ratios of the refresh rates, the prime factors of the refresh rates, and a common line rate for providing frames to the display system at the different refresh rates. The GPU 140 provides frames to the display system 130 at a selected one of the refresh rates using the same line rate regardless of which refresh rate is chosen. Furthermore, the line rate is an integer for frames provided at the refresh rates.

Figure 2:
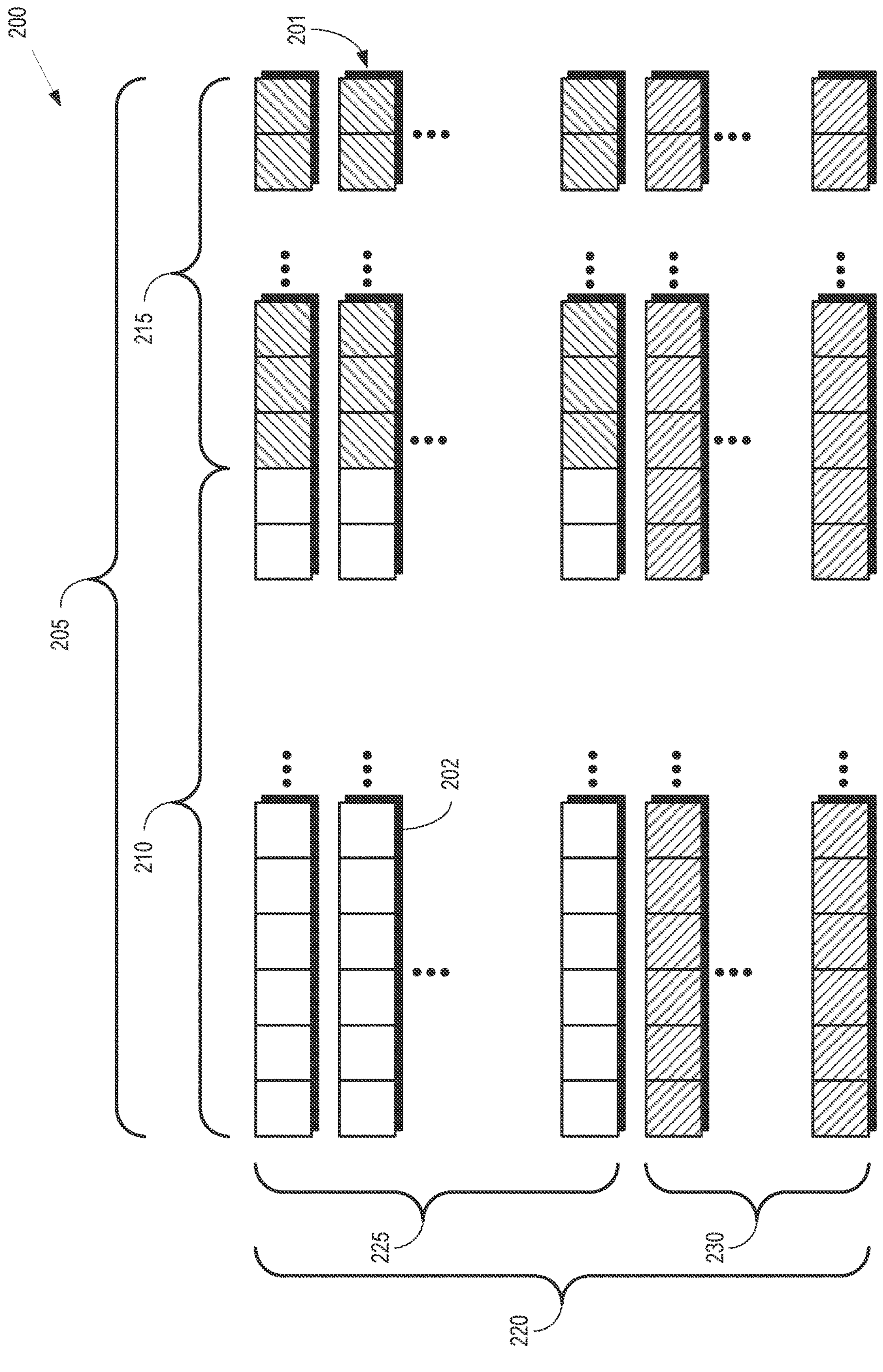
FIG. 2 is a block diagram of a frame that is generated by a GPU and provided to a display system according to some embodiments.

FIG. 2 is a block diagram of a frame 200 that is generated by a GPU and provided to a display system according to some embodiments. The frame 200 is generated (e.g., rendered) by some embodiments of the GPU 140 shown in FIG. 1 and displayed or presented by some embodiments of the display system 130 shown in FIG. 1.

The frame 200 is partitioned into lines 201 (only one indicated by a reference numeral in the interest of clarity) of pixels 202 (only one indicated by a reference numeral in the interest of clarity). Each line 201 includes a number 205 of pixels per line (HTotal). The number 205 of pixels per line includes a horizontal active region 210 that includes pixel values used to generate images (as indicated by the open boxes) and a horizontal blanking region 215 that conveys other information such as digital audio or metadata (as indicated by the hatched boxes). The frame 200 also includes a number 220 of lines per frame (VTotal). The number 220 of lines per frame includes a vertical active region 225 that includes pixel values (as indicated by the open boxes) and a vertical blanking region 230 that conveys other information such as digital audio or metadata (as indicated by the hatched boxes). Thus, the total number 220 of lines per frame is equal to a sum of the lines in the vertical active region 225 and the lines in the vertical blanking region 230. For example, a high definition frame can represent an image using 1080 active vertical lines that include values of the pixels and 45 vertical blanking lines.

The GPU provides the frame 200 (and the display system presents the frame 200) at a refresh rate. The frame 200 is therefore characterized by a pixel clock rate (PClk) that is equal to the product of the refresh rate, the number 205 of pixels per line, and the number 220 of lines per frame. A line rate for the frame 200 is defined as the pixel clock rate divided by the number 205 of pixels per line or, equivalently, as the product of the refresh rate and the number 220 of lines per frame.

The display system that presents the frame 200 supports variable refresh rates. The GPU therefore renders the frame 200 at different refresh rates corresponding to the variable refresh rates supported by the display system. The characteristics of the frame 200 are modified based on the variable refresh rate used to render the frame 200 and presented the frame 200 at the display system. The number 220 of lines per frame that are included in the frame 200 for the different refresh rates is determined based on ratios of the refresh rates, the prime factors of the refresh rates, and a common line rate for providing frames to the display system at the different refresh rates. For example, if the display system supports refresh rates of 50 Hz and 60 Hz, the ratio of the supported refresh rates is 5/6. The numbers 220 of lines per frame used at the different refresh rates are therefore chosen to have prime factors corresponding to the ratio of the supported refresh rates. For example, the number 220 for the frame 200 is chosen to be:

$$2250=2^1*3^2*5^3 \text{ at } 60 \text{ Hz}$$

and the number 220 for the frame 200 is chosen to be:

$$2250*\frac{6}{5}=2700 \text{ at } 50 \text{ Hz}.$$

Thus, the number 220 is a whole number for both refresh rates and the frame 200 has a common line rate for both refresh rates:

$$2250*60=2700*50=135 \text{ kHz}$$

In some embodiments, the parameters of the frame 200 are chosen to provide a common line rate over a larger range of refresh rates. For example, if a frame rate set supported by the display system includes the refresh rates 24 Hz, 25 Hz, and 30 Hz, the ratios of the refresh rates are:

$$\frac{30}{25}=\frac{6}{5}$$

$$\frac{30}{24}=\frac{5}{4}$$

The number 220 of lines in the frame 200 for the refresh rate of 30 Hz is chosen to have prime factors (5, $4=2^2$) so that the frame 200 is generated at 24 Hz and 25 Hz using the same line rate and pixel clock as the frame 200 at 30 Hz. In that case, the numbers 220 of lines for the different refresh rates is:

$$VTotal_{25}=VTotal_{30}*\frac{6}{5}$$

$$VTotal_{24}=VTotal_{30}*\frac{5}{4}$$

The numbers 220 of lines in the frame 200 at the different refresh rates ($VTotal_{24}$, $VTotal_{25}$, $VTotal_{30}$) are all whole numbers because the values of the refresh rates have prime factors (5, $4=2^2$). For example, the numbers 220 can have the values:

$$VTotal_{30}=2200=2^3*5^2*11^1$$

$$VTotal_{25}=2200*\frac{6}{5}=2640$$

$$VTotal_{24}=2200*\frac{5}{4}=2750$$

The frames 200 having the above numbers 220 of lines also have the same line rates:

$$2200*30=2640*25=2750*24=66 \text{ kHz}$$

Although the examples discussed above include two and three different refresh rates, some embodiments of these techniques are applied to larger sets of refresh rates. Moreover, other prime factors can also be used, including, but not limited to, the prime factors 7, 11, and 13.

In some embodiments, the number 220 of lines is constrained to be above a minimum number of lines. For example, the pixels in the vertical blanking region 230 can be used to convey audio information. The minimum number of lines can therefore be set based on a required (or minimum) audio bandwidth per line or per frame. In some embodiments, the number 205 of pixels per line is constrained by the required audio bandwidth or other overhead requirements. In some embodiments, the pixel rate for the frame 200 is constrained based on parameters defined in a timing descriptor. For example, an 18-byte detailed timing descriptor (DTD) structure defined in Enhanced Extended Display Identification Data (E-EDID) allows pixel rates to be specified in terms of 10 kilo-pixels per second (kPix/s), e.g., within a range of 0.01 MPix/s to 655.35 MPix/s. For another example, a 20-byte DTD structure defined in E-EDID allows pixel rates to be specified in terms of 1 kPix/s, e.g., within a range of 0.001 MPix/s to 16777.216 MPix/s.

Figure 3:
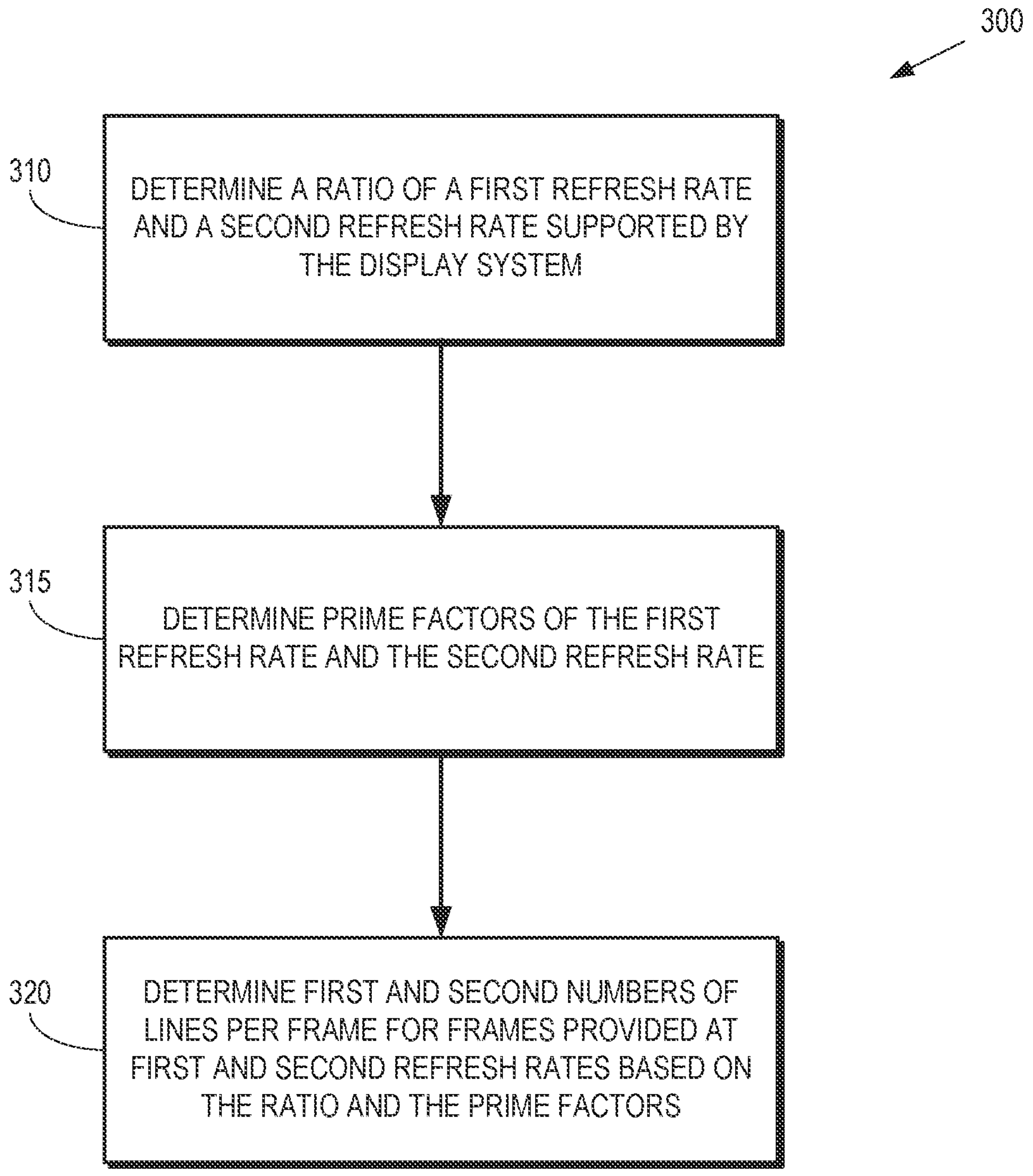
FIG. 3 is a flow diagram of a method of determining numbers of lines per frame for frames provided at different refresh rates according to some embodiments.

FIG. 3 is a flow diagram of a method 300 of determining numbers of lines per frame for frames provided at different refresh rates according to some embodiments. The method 300 is implemented in some embodiments of the processing system 100 shown in FIG. 1.

At block 310, the processing system determines a ratio between a first refresh rate and a second refresh rate supported by the display system. For example, as discussed herein, the ratio between a 50 Hz refresh rate and a 60 Hz refresh rate is 5/6.

At block 315, the processing system determines prime factors of the refresh rates. For example, the prime factors of the 50 Hz refresh rate are (5, 2) and the prime factors of the 60 Hz refresh rate are (5, 3, 2).

At block 320, the processing system determines a first number of lines per frame for frames provided at the first refresh rate and a second number of lines per frame for frames provided at the second refresh rate. The first and second numbers of lines per frame are determined based on the ratio of refresh rates and the prime factors. For example, the first number of lines per frame is selected to have a value that shares one or more prime factors with the second refresh rate and the second number of lines per frame is selected to have a value that shares one or more prime factors with the first refresh rate. Thus, the first and second numbers of lines per frame are whole numbers and produce the same line rate. The first and second numbers of lines per frame are also determined so that the line rates of the frames having the first and second numbers of lines per frames are both equal to the common line rate.

Figure 4:
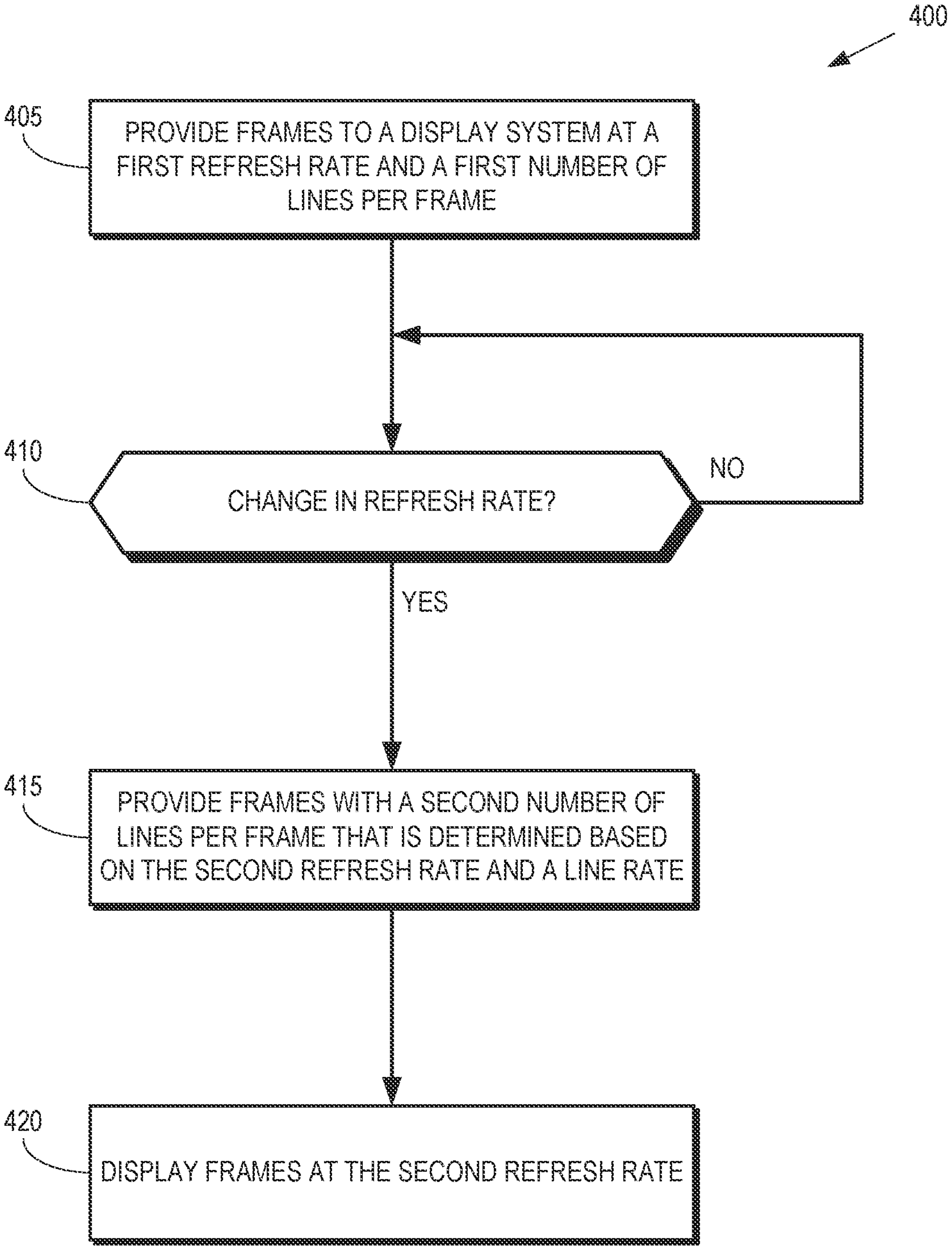
FIG. 4 is a flow diagram of a method of modifying numbers of lines per frame in response to changing a refresh rate according to some embodiments.

FIG. 4 is a flow diagram of a method 400 of modifying numbers of lines per frame in response to changing a refresh rate according to some embodiments. The method 400 is implemented in a processing unit such as some embodiments of the CPU 115 or the GPU 140 in the processing system 100 shown in FIG. 1.

At block 405, a processing unit such as a GPU is rendering frames at a first refresh rate and providing the frames to a display system. The display system is a variable refresh rate system and the first refresh rate is one of a set of refresh rates that is supported by the display system. As discussed herein, the frames initially include a first number of lines per frame that is determined based on one or more ratios of the refresh rates in the set supported by the display system, prime factors of the refresh rates, and a common line rate for providing frames to the display system at all the refresh rates in the set.

At decision block 410, the processing unit and the display system determine whether there is been a change in refresh rate. If not, the method 400 continues to monitor for changes in the refresh rate. If a change in the refresh rate is detected, the method 400 flows to block 415.

At block 415, the processing unit provides frames having a second number of lines per frame. The processing unit renders the frames at a second refresh rate that differs from the first refresh rate. The second number of lines per frame is determined based on the second refresh rate and the line rate, as discussed herein.

At block 420, the processing unit provides the frames to the display unit, which presents or displays the frames at the second refresh rate. The first and second numbers of lines per frame in the frames transmitted at the first and second refresh rates are determined based on one or more ratios of the refresh rates, the prime factors of the refresh rates, and the common line rate. The line rates are therefore whole numbers and the display system does not need to account for fractional line rates. Furthermore, the display system does not perform a mode reset in response to detecting a change in the refresh rate or number of lines per frame.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

determining a plurality of prime factors of a plurality of frame rates used to display frames on a screen;

determining a plurality of numbers of lines per frame in frames provided at the plurality of frame rates based on at least one ratio of the plurality of frame rates, the plurality of prime factors, and a line rate for providing frames at the plurality of frame rates; and selectively providing frames at one frame rate of the plurality of frame rates.

2. The method of claim 1, wherein determining the plurality of prime factors comprises determining first prime factors and second prime factors of first and second frame rates, respectively.

3. The method of claim 2, wherein determining the plurality of numbers of lines per frame comprises determining first and second numbers of lines per frame in frames provided at the first and second frame rates, respectively, based on a ratio of the first and second frame rates, at least one of the first prime factors, at least one of the second prime factors, and the line rate.

4. The method of claim 3, wherein selectively providing the frames comprises selectively providing frames at the first frame rate with the first number of lines per frame or the second frame rate with the second number of lines per frame.

5. The method of claim 4, wherein a ratio of the first number of lines per frame to the second number of lines per frame is equal to a ratio of at least one of the second prime factors to at least one of the first prime factors.

6. The method of claim 1, wherein selectively providing the frames comprises providing frames at the line rate for all the plurality of frame rates.

7. The method of claim 1, wherein determining the plurality of numbers of lines per frame comprises determining the plurality of numbers of lines per frame based on ratios formed based on the plurality of prime factors such that the line rate is the same for the plurality of frame rates.

8. The method of claim 7, wherein determining the plurality of numbers of lines per frame comprises determining the plurality of numbers of lines per frame based on the ratios formed based on the plurality of prime factors such that number of lines per frame for all frame rates is an integer.

9. An apparatus comprising:

a screen operable at a plurality of frame rates having a plurality of prime factors; and a display controller coupled to the screen and configured to receive frames from a source at a first frame rate of the plurality of frame rates supported by the apparatus and display the frames on the screen at the first frame rate, wherein the frames displayed at the plurality of frame rates comprise a plurality of numbers of lines per frame that is determined based on at least one ratio of the plurality of frame rates, the plurality of prime factors, and a line rate for frames at the plurality of frame rates.

10. The apparatus of claim 9, wherein the plurality of frame rates comprises a first frame rate and a second frame rate, wherein the plurality of numbers of lines per frame comprises first and second numbers of lines per frame, and wherein the plurality of prime factors comprises first prime factors and second prime factors of the first and second frame rates, respectively.

11. The apparatus of claim 10, wherein the first and second numbers of lines per frame in frames displayed at the first and second frame rates, respectively, are determined based on a ratio of the first and second frame rates, at least one of the first prime factors, at least one of the second prime factors, and the line rate.

12. The apparatus of claim 11, wherein the display controller is configured to display frames at the first frame rate with the first number of lines per frame or the second frame rate with the second number of lines per frame.

13. The apparatus of claim 12, wherein a ratio of the first number of lines per frame to the second number of lines per frame is equal to a ratio of at least one of the second prime factors to at least one of the first prime factors.

14. The apparatus of claim 9, wherein the display controller is configured to display frames at the line rate for the plurality of frame rates.

15. The apparatus of claim 9, wherein the plurality of numbers of lines per frame is based on ratios formed based on the plurality of prime factors such that the line rate is the same for the plurality of frame rates.

16. The apparatus of claim 15, wherein number of lines per frame is an integer for frames displayed at the plurality of frame rates.

17. A method comprising:

providing frames having a first number of lines per frame to a display system at a first refresh rate; and in response to a change to a second refresh rate, providing frames having a second number of lines per frame at the second refresh rate, wherein the first number of lines per frame and the second number of lines per frame are based on one or more ratios of the first and second refresh rates, prime factors of the first and second refresh rates, and a common line rate.

18. The method of claim 17, further comprising determining the prime factors of the first and second refresh rates, wherein determining the prime factors includes determining first prime factors and second prime factors of first and second refresh rates, respectively.

19. The method of claim 18, further comprising determining the first number of lines per frame and second number of lines per frame, wherein the determining the first number of lines per frame and second number of lines per frame includes determining first and second numbers of lines per frame in frames provided at the first and second refresh rates, respectively, based on a ratio of the first and second refresh rates, at least one of the first prime factors, at least one of the second prime factors, and the line rate.

20. The method of claim 19, wherein providing frames having a second number of lines per frame at the second refresh rate includes selectively providing frames at the first refresh rate with the first number of lines per frame or the second refresh rate with the second number of lines per frame.

* * * * *